US010423606B2

(12) United States Patent
Bender et al.

(10) Patent No.: US 10,423,606 B2
(45) Date of Patent: *Sep. 24, 2019

(54) AUTOMATED SUSPENSION AND REBUILDING OF DATABASE INDICES

(71) Applicant: International Business Machines Corporation, Armonk, NY (US)

(72) Inventors: Michael Bender, Rye Brook, NY (US); Wayne M. Delia, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/933,877

(22) Filed: Mar. 23, 2018

(65) Prior Publication Data

US 2018/0218028 A1    Aug. 2, 2018

Related U.S. Application Data

(63) Continuation of application No. 14/477,924, filed on Sep. 5, 2014, now Pat. No. 10,025,814.

(51) Int. Cl.
    *G06F 16/00*    (2019.01)
    *G06F 16/23*    (2019.01)
(52) U.S. Cl.
    CPC ............... *G06F 16/2372* (2019.01)
(58) Field of Classification Search
    CPC .................................. G06F 16/2372
    See application file for complete search history.

(56) References Cited

U.S. PATENT DOCUMENTS

| 6,662,176 | B2 | 12/2003 | Brunet et al. |
| 67,217,491 | | 4/2004 | Najm et al. |
| 7,028,022 | B1 | 4/2006 | Lightstone et al. |
| 7,308,456 | B2 | 12/2007 | Friske et al. |
| 7,734,602 | B2 | 6/2010 | Folkert et al. |
| 7,778,985 | B2 | 8/2010 | Scholtz |
| 7,779,045 | B2 | 8/2010 | Mohamed et al. |
| 7,788,985 | B2 | 9/2010 | Johnson et al. |

(Continued)

OTHER PUBLICATIONS

Internet Society et al., "The Architecture of the Common Indexing Protocol (CIP) (RFC2651)", Original Publication Date: Aug. 1, 1999, IP.com No. IPCOM000003240D, IP.com Electronic Publication: Sep. 13, 2000, Copyright (C) The Internet Society (1999).

(Continued)

*Primary Examiner* — Cheryl Lewis
(74) *Attorney, Agent, or Firm* — Maeve M. Carpenter (57) ABSTRACT

Embodiments of the present invention disclose a method, computer program product, and a computer system for suspending a database index. A computer determines if an update to a database includes an update to an index of the database. If so, the computer suspending the index of the database, wherein the suspending the index of the database comprises: the computer deleting the index of the database; the computer retaining a definition for the index of the database, wherein the definition includes a command for rebuilding the index of the database; and the computer indicating in a system catalog of the database that a status of suspension has been applied to the index.

20 Claims, 6 Drawing Sheets

(56) References Cited

U.S. PATENT DOCUMENTS

| | | | |
|---|---|---|---|
| 7,966,283 | B2 | 6/2011 | Kilmartin |
| 8,433,680 | B2 | 4/2013 | Ling et al. |
| 9,459,969 | B1 | 10/2016 | Hebbar et al. |
| 9,720,924 | B2 | 8/2017 | Bender et al. |
| 2005/0223027 | A1* | 10/2005 | Lawrence ............... G06F 16/90 |
| 2005/0235004 | A1 | 10/2005 | Folkert et al. |
| 2008/0307009 | A1* | 12/2008 | Anderson ........... G06F 16/2272 |
| 2010/0281005 | A1* | 11/2010 | Carlin ..................... G06F 16/22 707/696 |
| 2013/0018890 | A1 | 1/2013 | Rajan et al. |
| 2015/0186441 | A1 | 7/2015 | Chang et al. |
| 2016/0070745 | A1 | 3/2016 | Bender et al. |
| 2016/0070746 | A1 | 3/2016 | Bender et al. |
| 2017/0316020 | A1 | 11/2017 | Bender et al. |
| 2017/0316021 | A1 | 11/2017 | Bender et al. |

OTHER PUBLICATIONS

IBM et al., "A Method and System to Enhance Query Performance by Autonomically Creating and Deleting Database Indices at Runtime", Original Publication Date: Sep. 24, 2003, IP.com No. IPCOM000019661D, IP.com Electronic Publication: Sep. 24, 2003, pp. 1-3.

IBM, "Changing GPFS disk states and parameters", IBM, GPFS Administration and Programming Reference SA23-2221-08, Accessed on Jan. 15, 2014, Copyright IBM Corporation 1990, 2013, 2 pages, <https://www.ibm.com/support/knowledgecenter/SSFKCN_4.1.0/com.ibm.cluster.gpfs.v4r1.gpfs100.doc/bl1adm_chdisk.htm>.

Lynge, Ole, "How do I monitor and find unused indexes in sql database", Stack Overflow, Asked Sep. 21, 2009 at 19:53, 6 pages, <http://stackoverflow.com/questions/1456496/how-do-i-monitor-and-find-unused-indexes-in-sql-database>.

"13.1.2. Alter Table Syntax", MySQL 3.23, 4.0, 4.1 Reference Manual, 13 SQL Statement Syntax, User Comment posted by Tom S on Dec. 18, 2002 4:27 PM, © 1995-2005 MySQL AB, 8 pages, <http://web.archive.org/web/20051202071102/http://dev.mysql.com/doc/refman/4.1/en/alter-table.html>.

Disable and re-enable all indexes in a SQL Server database, page 4-5, answered by Phillip Kelly (hereafter Kelly), http://stackoverflow.com/questions/18236055/disable-and-re-enable-all-indexes-in-apasql-server-database, Aug 2014.

IBM Appendix P, list of patents and patent applications treated as related, filed herewith, 2 pages.

* cited by examiner

AUTOMATED SUSPENSION AND REBUILDING OF DATABASE INDICES

CROSS REFERENCE TO RELATED APPLICATIONS

This application is a continuation of U.S. patent application Ser. No. 14/477,924, filed Sep. 5, 2014, now U.S. Pat. No. 10,025,814, which is incorporated by reference in its entirety.

BACKGROUND OF THE INVENTION

The present invention relates generally to the field of indexing data, and more particularly to suspending a database index in a data processing system.

Computer databases allow the storage of digital data in an organized format that allows searches to retrieve a particular subset of data utilizing specialized commands in a query language, such as Structured Query Language (SQL). SQL enables data entry, manipulation, and deletion within database tables. Client applications may generate SQL statements based on user input. Stored database procedures may include SQL statements, which run either on a schedule or on request by a Database Administrator (DBA). The SQL is executed by a Database Management System (DBMS), which is a software system designed to control access and allow administration of a database. A query describes the data being requested from the database, but does not define the best path for retrieving that data from the database. A query optimizer defines the most efficient way to execute a given query within a database system.

In a database environment, the query optimizer utilizes database indices to determine the best path for a DBMS to access specific data in a database table. Indices enable a query to locate data quickly without having to search entire rows of a database table. A database index is a data structure that improves the speed of data retrieval operations on a database table by storing a copy of one or more selected columns of data from a table with a pointer back to the complete row of data from which the column item was copied. Some indices are created for special use and only create entries for records satisfying a selected condition, function, or expression, such as for a specific customer. In some cases, databases may have multiple indices covering a single database table. Each index is stored as a separate searchable entity from the data in the database tables. The DBMS maintains each index as information is inserted into, removed from, and updated in the rows of the database tables. When processing large volumes of updates to a database, the DBA may delete an index, and then rebuild the index at the end of processing rather than performing incremental updates during the load.

SUMMARY

Embodiments of the present invention disclose a method, computer program product, and a computer system for suspending a database index. A computer determines if an update to a database includes a request to suspend an index of the database. If so, the computer determining if the request to suspend includes a parameter indicating an immediate suspension of the index. If so, the computer suspending the index of the database, wherein the suspending the index of the database comprises: the computer deleting the index of the database; the computer retaining a definition for the index of the database, wherein the definition includes a command for rebuilding the index of the database; and the computer indicating in a system catalog of the database that a status of suspension has been applied to the index, wherein the status is used to determine whether the index is available for use when processing a query and wherein the status of suspension indicates the index should not be used when processing a query.

DETAILED DESCRIPTION

When large volumes of database updates are expected, such as during an extract, transform, load (ETL) operation, the current database procedures call for the database administrator to delete the indices manually for affected database tables, and rebuild the indices after the large volumes of data are loaded into the table. In accordance with the present invention, embodiments recognize that a database index immediately becomes unusable when the index is dropped or suspended, and will remain suspended in the event of a processing problem awaiting a resolution. Embodiments recognize that the suspended index is unusable even though the content of the index may not have changed, and may remain unchanged after the current data loading operation.

In accordance with the present disclosure, embodiments provide for a database management system (DBMS) with an index suspension process with options for immediate suspension or delayed suspension. Embodiments provide for a suspension process, which retains the metadata defining the suspended index to allow for quick rebuilding of the index. Embodiments provide for a suspension process, in which the contents of the index are retained as long as the index does not require an update. Embodiments include requests for suspension of an index, which may include a sub-set of available indices for a database table, and the sub-set of indices may be an inclusion or exclusion list. Embodiments include requests for actuation of a suspended index utilizing either temporal limits, or a first access option. Embodiments provide for an indicator in the system catalog of the database for each index indicating a status of suspend, suspend-pending, or active.

Embodiments provide for a query optimizer in a DBMS capable of using an index in a pending suspension status for determining an access path for a query.

Embodiments provide for changing the status of an unchanged database index from suspended to active without rebuilding if no changes occurred during a data load process within the suspension time. Embodiments provide for a reference in the system catalog to a scheduled event for automatically actuating an index after suspension using a scheduled batch job. The scheduled event may include, but is not limited to, at least one of: a day, date, day of week, timestamp, and time. Embodiments provide for immediate actuating of an index through received commands. Embodiments provide for a DBMS, which determines whether to rebuild or simply to reactivate an index during actuation based, at least in part, on attempts to update the index during suspension.

An embodiment, in accordance with the present invention, recognizes that rebuilding database indices only when needed, and automating the suspension, and actuating (or rebuilding) of indices increases efficiencies associated with valuable computing resources and improve throughput of database administrators.

The embodiment illustrated in the Figures describes the interaction of a relational database and query statements, using SQL as the query language. Specific details disclosed herein are not to be interpreted as limiting, but merely as a representative basis for teaching one skilled in the art to variously employ the methods and structures of the present disclosure. Embodiments of the present invention may apply to all database types, including but not limited to relational, hierarchical, network, and object-oriented databases. Likewise, embodiments of the present invention may apply to other query languages, including but not limited to SQL, QUEL, OQL, and SEQUEL. Specific details disclosed herein are not to be interpreted as limiting, but merely as a representative basis for teaching one skilled in the art to variously employ the methods and structures of the present disclosure. Implementation of embodiments of the invention may take a variety of forms, and implementation details are discussed subsequently with reference to the Figures.

Figure 1:
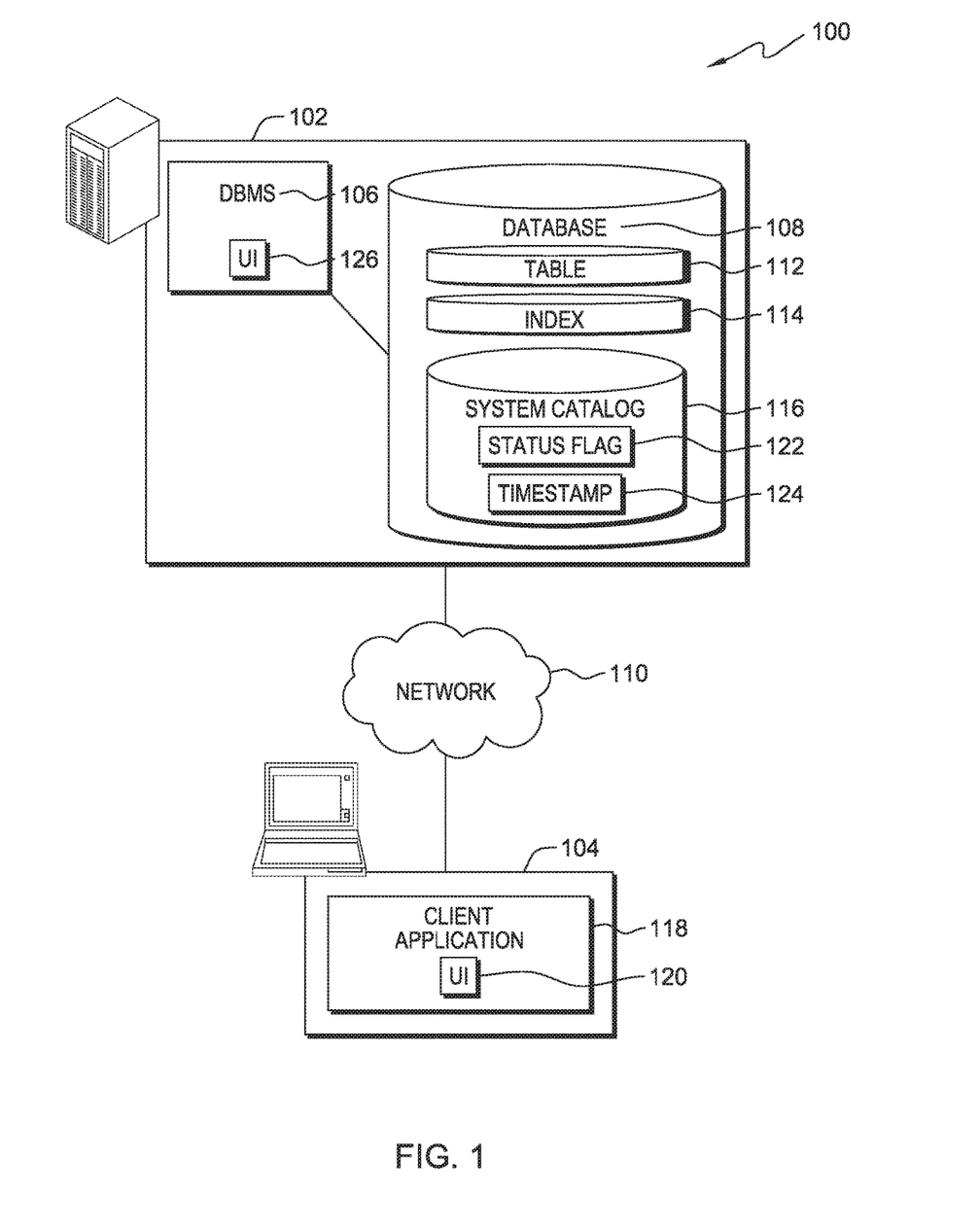
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. Distributed data processing environment 100 includes server computer 102, and client computer 104, interconnected over network 110. Distributed data processing environment 100 may include additional server computers, client computers, or other devices not shown.

Network 110 can be, for example, a local area network (LAN), a wide area network (WAN) such as the Internet, or a combination of the two, and can include wired, wireless, fiber optic, or any other connection known in the art. In general, network 110 can be any combination of connections and protocols that may support communications between server computer 102 and client computer 104, in accordance with an embodiment of the present invention.

Server computer 102 can be a server computer, an application server, a laptop computer, a tablet computer, a netbook computer, a personal computer (PC), a desktop computer, a personal digital assistant (PDA), a smart phone, or any programmable electronic device capable of communicating with client computer 104 via network 110. In certain embodiments, server computer 102 can represent a computer system utilizing clustered computers and components that act as a single pool of seamless resources when accessed through network 110, as is common in data centers and with cloud computing applications. Server computer 102 may be a node in a distributed database management environment. In general, server computer 102 can be representative of any computing device or a combination of devices with respective access to DBMS 106 and database 108, and server computer 102 is capable of executing DBMS 106. Server computer 102 may include internal and external hardware components, as depicted and described in further detail with respect to FIG. 5.

Server computer 102 includes an instance of a relational database management system, such as DBMS 106, and a connection to database 108. In the depicted environment, DBMS 106 may be a suite of database management applications that allow the definition, creation, querying, updating, and administration of databases, such as database 108. In other embodiments, DBMS 106 and database 108 may be on one computer, or more than one computer, and each item itself may be split into a plurality of parts or modules and spread across more than one computer. DBMS 106 interacts with a user via UI 126, with other applications such as client application 118 on client computer 104, and with one or more databases, such as database 108. DBMS 106 receives and processes queries, which store, update, or retrieve data in table 112 residing in database 108, and sends values associated with the query back to the requestor, such as client application 118 on client computer 104 via network 110. In one embodiment, DBMS 106 includes a query optimizer to generate the most efficient access path to execute queries on table 112 utilizing index 114. DBMS 106 has the capability to create, update, and delete indices of database 108, such as index 114 for table 112, within distributed data processing environment 100. In various embodiments, DBMS 106 allows a user to suspend or actuate an index of a database table using, for example, SQL commands. DBMS 106 may store the status of index 114 indicated as ACTIVE, SUSPEND, or SUSPEND-PENDING in status flag 122 within system catalog 116 of database 108 on server computer 102. DBMS 106 may store details, such as a day and time, for a scheduled event in timestamp 124 for index 114 within system catalog 116. DBMS 106 uses the day and time of timestamp 124 to delay the actuating or rebuilding of index 114 when index 114 is in the SUSPEND or SUSPEND-PENDING status. In accordance with embodiments of the present invention, DBMS 106 may read data from table 112 via queries optimized with index 114 while index 114 is in the ACTIVE or SUSPEND-PENDING mode. Operational flows for index suspension, index usage under suspension, and index actuation performed by DBMS 106 are described further in FIGS. 2 through 5.

Server computer 102 includes an instance of a user interface, UI 126, within DBMS 106, which may utilize a web page application, a command line processor, or any other graphical user interface (GUI). UI 126 includes components used to receive input from a user of server computer 102 and transmit the input to DBMS 106. In an embodiment, UI 126 uses a combination of technologies and devices, such as device drivers, to provide a platform to enable users of server computer 102 to interact with DBMS 106. In one embodiment, UI 126 receives input, such as dragging and dropping data icons onto a workspace using a physical input device, such as a keyboard or mouse, via a device driver that corresponds to the physical input device. In another embodiment, UI 126 receives input such as typed SQL commands or statements from a user of server computer 102 through a keyboard.

Server computer 102 includes an instance of database 108. Database 108 may be a relational database, a non-relational database, hierarchical databases, or any other data structure utilizing one or more indices for optimizing queries on the data within database 108. DBMS 106 may collect data from various sources (not shown), each with differing formats of data organization, and which are transformed into a single format appropriate for validation processing and loading into database 108 on server computer 102. Database 108 includes one or more database tables, such as table 112, one or more indices, such as index 114, and system catalog 116. System catalog 116 includes metadata, which defines database objects, such as table 112, index 114, user ID's, and user groups of database 108. The metadata within system catalog 116 allows DBMS 106 to rebuild index 114 when required. System catalog 116 includes one or both of the following for each index: status flag 122 and timestamp 124. Status flag 122 includes an indication of the status of index 114 as either ACTIVE, SUSPEND or SUSPEND-PENDING. One skilled in the art will recognize that the status may be indicated using text, or numbers, and does not require the usage of the words ACTIVE or SUSPEND. Timestamp 124 for index 114 stored within system catalog 116 includes a day and time. DBMS 106 uses the day and time of timestamp 124 to delay the actuating or rebuilding of index 114 when index 114 is in the SUSPEND or SUSPEND-PENDING status. In one embodiment, system catalog 116 retains the metadata for rebuilding index 114 when status flag 122 is updated to indicate SUSPEND, and index 114 is either deleted or emptied of contents.

In various embodiments, client computer 104 can be a laptop computer, a tablet computer, an application server, a netbook computer, a personal computer (PC), a desktop computer, a personal digital assistant (PDA), a smartphone, or any programmable electronic device capable of communicating with server computer 102 via network 110. In general, client computer 104 can be representative of any computing device or a combination of devices with access to client application 118, and is capable of executing client application 118. In other embodiments, DBMS 106, client application 118, and database 108 may be on one computer. Client computer 104 may include internal and external hardware components, as depicted and described in further detail with respect to FIG. 5.

Client computer 104 includes an instance of client application 118, which may execute locally and has the capability to access database 108 and DBMS 106 on server computer 102 via network 110. In one embodiment, client application 118 may be a suite of applications including, but not limited to, business intelligence tools, database management tools, metadata management and retrieval tools, reporting tools, and analysis tools used by business professionals for data mining, online analytical processing, and market research. In some embodiments, client application 118 may be an associated client application created by the vendor or developer of DBMS 106 for use in a server-client environment. Client application 118 may use a graphical notation to construct data integration solutions with icons for database 108, and a related query or job stream of data load instructions. In the depicted environment, client application 118 uses a user interface, such as UI 120, to receive user input, and to output responses to a user. In the depicted embodiment, client application 118 is an application allowing authorized users, such as database developers and architects, to request DBMS 106 to suspend or actuate indices of a database while loading data into table 112, or to schedule a job to actuate a suspended index, such as index 114 on server computer 102. The request to suspend or actuate index 114 may be included in a job stream built with client application 118.

Client computer 104 includes an instance of a user interface, UI 120, within client application 118, which may utilize a web page application, a command line processor, or any other graphical user interface (GUI). UI 120 includes components used to receive input from a user and transmit the input to client application 118 residing on client computer 104. In an embodiment, UI 120 uses a combination of technologies and devices, such as device drivers, to provide a platform to enable users of client computer 104 to interact with client application 118. In an embodiment, UI 120 receives input, such as dragging and dropping data icons onto a workspace using a physical input device, such as a keyboard or mouse, via a device driver that corresponds to the physical input device.

In the illustrative embodiment, client application 118 receives from a user, via UI 120, the database location information and validation credentials for access to database 108 with the added authorization to suspend or actuate index 114. Client application 118 transmits the validation credentials to DBMS 106 on server computer 102 via network 110. In database 108, index 114 references specific columns within table 112. Client application 118 allows the user to request DBMS 106 to suspend or actuate index 114 for table 112 in database 108. In response, DBMS 106 sets an indicator, such as status flag 122, of index 114 within system catalog 116 to indicate a status of ACTIVE, SUSPEND, or SUSPEND-PENDING. Client application 118 allows the user to specify or select one or more options related to suspending or actuating index 114 including, but not limited to, an immediate suspend option, a delayed suspend option, a temporal option, a first access option, and a scheduled batch job option. If the user selects the temporal option, client application 118 allows the user to specify a time to actuate index 114, which is stored in timestamp 124 of system catalog 116 for index 114. The request to suspend or actuate index 114 may be submitted in the form of an SQL command keyed manually through a command line processor, generated automatically by client application 118 from user input, or programmatically through an automated batch job or job stream. One skilled in the art will recognize that there may be other ways to submit the request to suspend or actuate index 114.

In the illustrative embodiment, DBMS 106 receives a query from client application 118 on client computer 104 via network 110. The query requests the retrieval of a subset of data from table 112. DBMS 106 uses a query optimizer to generate the most efficient access path to execute the received query utilizing index 114. A query optimizer is a part of DBMS 106 which analyzes a query statement and chooses the most efficient access path from the possible query plans using input from the indices associated with the relevant database tables. If status flag 122 for index 114 is set to SUSPEND and the current time is after the time in timestamp 124, then DBMS 106 rebuilds index 114 based on metadata stored in system catalog 116, sets status flag 122 to ACTIVE, clears timestamp 124 in system catalog 116, and only then allows the query optimizer to use index 114. If status flag 122 for index 114 is set to SUSPEND and the current time is before the time in timestamp 124, then the query optimizer determines the query access path without using index 114. If status flag 122 for index 114 is set to SUSPEND-PENDING or ACTIVE, the query optimizer of DBMS 106 may use index 114 to determine the query access path.

In the illustrative embodiment, DBMS 106 receives a request from client application 118 or from within DBMS 106 to modify table 112 based on commands such as SQL statements. Each time DBMS 106 modifies table 112 such that a column used by index 114 requires updating, DBMS 106 modifies index 114 to match. If status flag 122 for index 114 indicates a status of ACTIVE, then DBMS 106 modifies index 114 to match. If status flag 122 for index 114 indicates a status of SUSPEND or SUSPEND-PENDING, then DBMS 106 does not modify index 114.

In the illustrative embodiment, DBMS 106 receives a request from a requestor, such as client application 118, to actuate index 114 for table 112. If status flag 122 for index 114 indicates a status of SUSPEND, then DBMS 106 rebuilds index 114 based on metadata stored in system catalog 116, sets status flag 122 to indicate a status of ACTIVE, and clears timestamp 124 in system catalog 116. If status flag 122 for index 114 indicates a status of SUSPEND-PENDING, then DBMS 106 sets status flag 122 to indicate a status of ACTIVE, and clears timestamp 124 in system catalog 116. Whenever DBMS 106 clears timestamp 124, if a scheduled batch job exists to actuate index 114, then DBMS 106 cancels the scheduled batch job.

Figure 2:
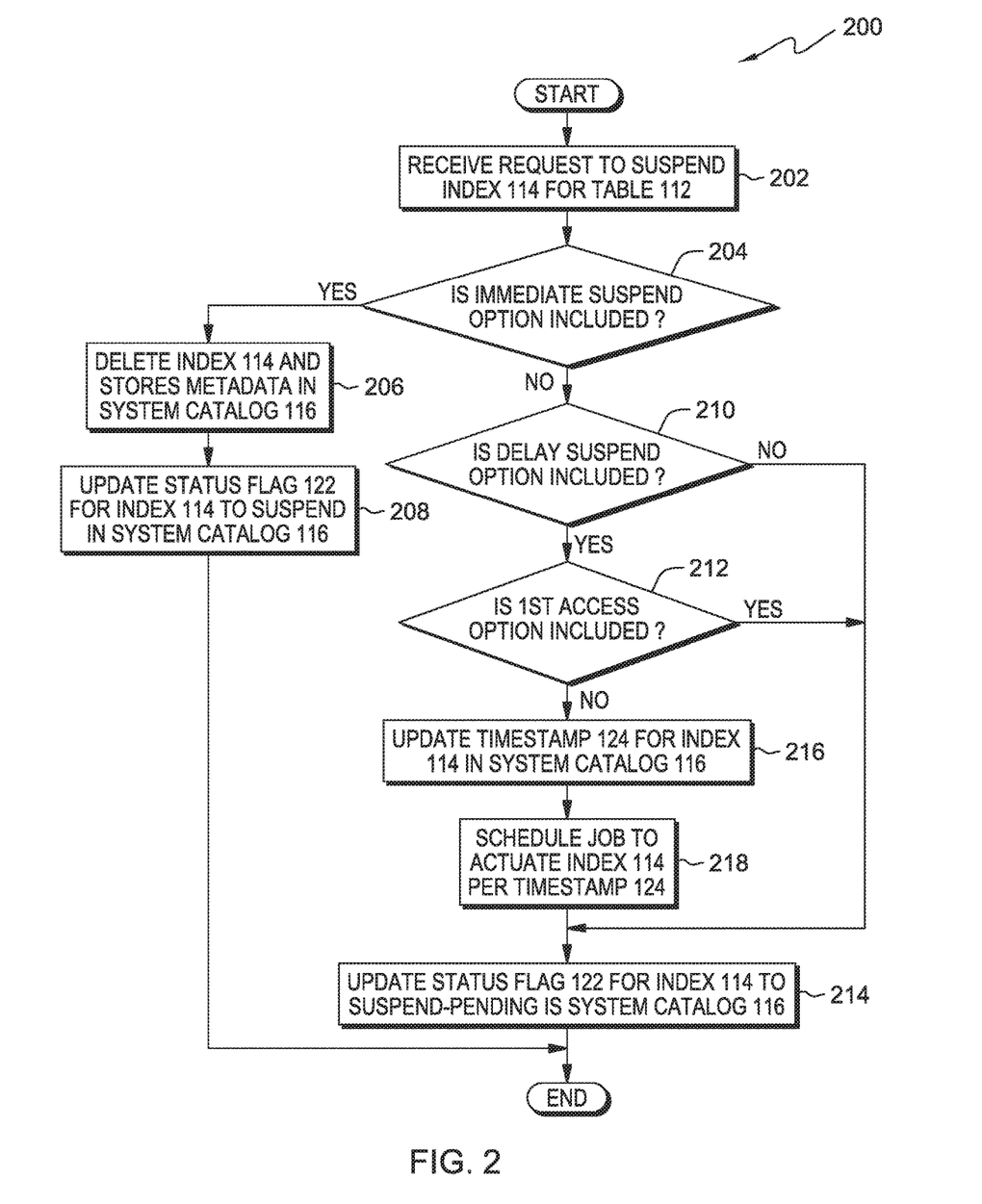
FIG. 2 is a flowchart depicting the operational steps of a DBMS for suspending a database index, in accordance with an embodiment of the present invention.

FIG. 2 is a flowchart depicting the operational steps of DBMS 106 for suspending a database index, in accordance with an embodiment of the present invention. Flow 200 depicts suspending database index 114 including options for immediate or delayed suspension, suspension upon first update, and scheduling a job to actuate index 114 at a later time. Embodiments include requests to suspend an index with options for immediate suspension or delayed suspension. In the illustrative embodiment, DBMS 106 on server computer 102 enables a user of client application 118 on client computer 104 to request suspension of index 114 for table 112 in database 108. In alternate embodiments, a user may request the suspension of one or more indices of one or more tables within a database. Flow 200 depicted in FIG. 2 is merely an illustration, and should not be limiting in the number of indices that may be suspended at one time.

Initially, DBMS 106 on server computer 102 receives credentials from a user of server computer 102 or client computer 104 for validation. A person of ordinary skill in the art may recognize that users, such as database administrators or developers, of client application 118 on client computer 104 or of DBMS 106 on server computer 102 may request validation of credentials before accessing database 108 on server computer 102, and making updates to the information stored therein. In various embodiments, DBMS 106 provides for a user specific authority for suspending indices on database 108. Responsive to determining that the user has the proper authority, DBMS 106 performs the requested tasks. If the user does not have the proper authority, then no tasks involving suspending indices are performed.

DBMS 106 receives a request to suspend index 114 for table 112 (step 202). DBMS 106 on server computer 102 receives a request from a user of client application 118 on client computer 104 to suspend index 114 for table 112 in database 108. The request to suspend index 114 may be in the form of an SQL command submitted through a command line processor, submitted through an application, or submitted through an automated batch job. In an alternate embodiment, DBMS 106 receives the request to suspend index 114 from UI 126, which allows a user of server computer 102, such as a database administrator, to submit the request to suspend index 114. A person of ordinary skill in the art may recognize that a suspension request may come in other forms than an SQL command.

In alternate embodiments, a request may describe suspension of one or more indices, which may include all or a sub-set of indices for a database table, and the sub-set of indices may be implemented as either an inclusion or exclusion list. A request may have a list of one or more indices including indices belonging to more than one database table in a database. For simplicity, the illustrative embodiment of FIG. 2 shows suspending a single index, but one skilled in the art will recognize the ability to suspend more than one index.

DBMS 106 determines if an immediate suspend option is included (decision block 204). The received request to suspend index 114 may include a parameter indicating the call for immediate suspension of index 114. If DBMS 106 determines that an immediate suspend option is included (yes branch, decision block 204), then DBMS 106 deletes index 114 and stores metadata defining index 114 in system catalog 116 (step 206). DBMS 106 interprets the parameter for immediate suspension and initiates to suspend index 114. To delete index 114, DBMS 106 clears out the contents of index 114, or physically deletes index 114, while retaining any related metadata defining index 114 to allow the subsequent rebuilding of index 114. When initially created, index 114 was defined by an SQL command entered by a DBA. In one embodiment, the SQL command is stored in system catalog 116 as part of a definition for index 114 to be used by DBMS 106 to rebuild index 114 when requested at a later time.

Figure 3:
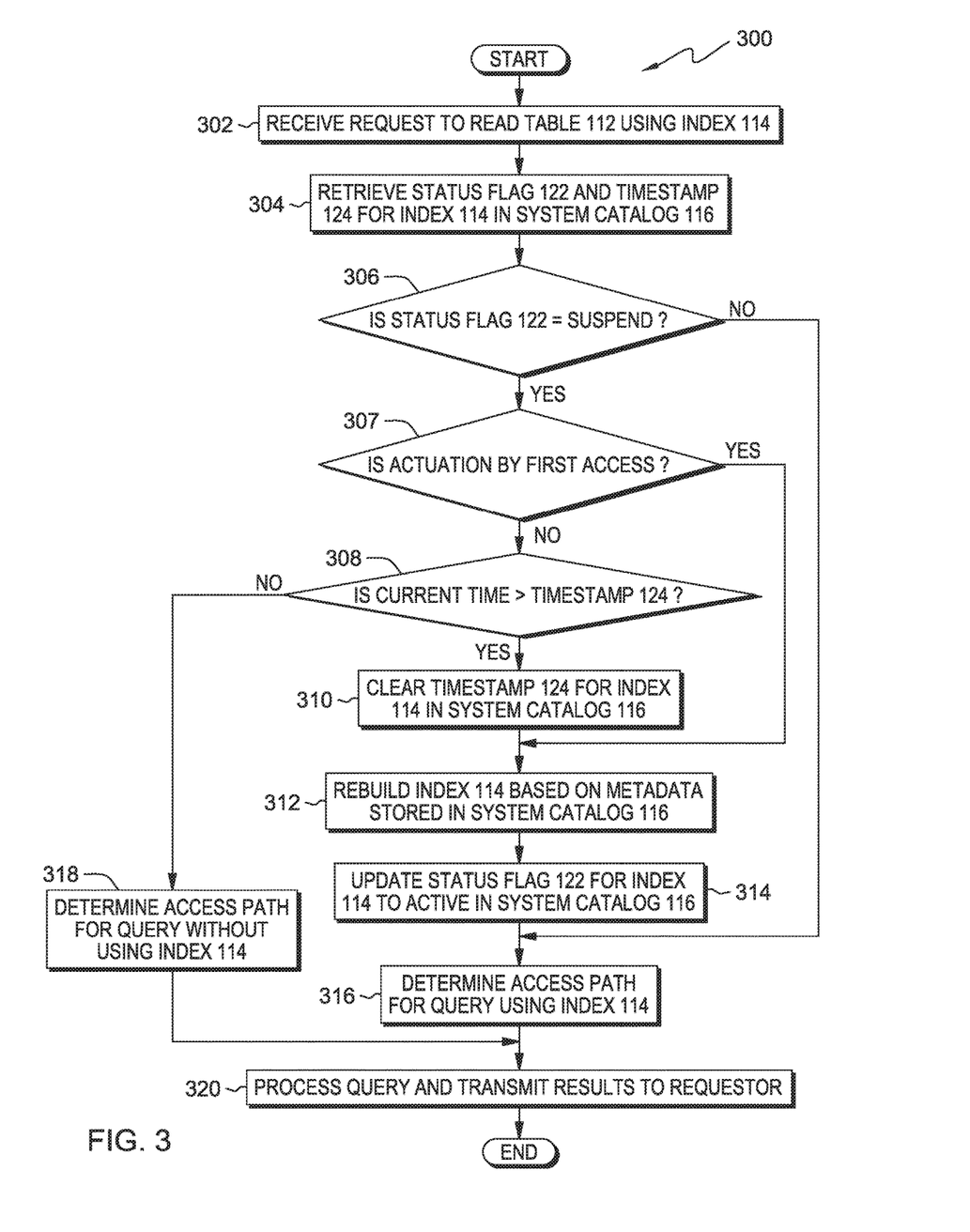
FIG. 3 is a flowchart depicting the operational steps of a DBMS for reading a database table with a suspended index, in accordance with an embodiment of the present invention.

DBMS 106 updates status flag 122 for index 114 to indicate a status of SUSPEND in system catalog 116 (step 208). After index 114 is cleared or deleted, DBMS 106 updates status flag 122, which is used by the query optimizer of DBMS 106 to determine if an index is available for use when processing a query, as depicted in FIG. 3. Index 114 is now in a state of suspension; the request has completed, and processing ends.

Returning to decision block 204, if DBMS 106 determines that an immediate suspend option is not included (no branch, decision block 204), then DBMS 106 determines if a delay suspend option is included (decision block 210). The received request to suspend index 114 may include a parameter indicating the call for a delayed suspension of index 114.

If DBMS 106 determines that a delay suspend option is not included (no branch, decision block 210), then DBMS 106 updates status flag 122 for index 114 to indicate a status of SUSPEND-PENDING in system catalog 116 (step 214). The status of SUSPEND-PENDING means that index 114 is still available for use by the query optimizer of DBMS 106. In the case where neither an immediate suspension option nor a delayed suspension option is included in the request, the default is to set the status to SUSPEND-PENDING. At this point, index 114 has a status of pending suspension; the request has completed, and processing ends.

Returning to decision block 210, if DBMS 106 determines that a delay suspend option is included (yes branch, decision block 210), then DBMS 106 determines if a first access option is included (decision block 212). The received request to delay suspension of index 114 may include a selectable option or a parameter indicating that actuation of a previously suspended index is dependent on the first access of index 114 in relation to accessing table 112. For example, in one embodiment, after index 114 has been set to a status of SUSPEND and the contents of index 114 have been cleared, the query optimizer of DBMS 106 may not use index 114 until index 114 has been actuated or rebuilt. If the first access option is included in the received request, then DBMS 106 will actuate index 114 in response to the first request to access table 112 in which index 114 is needed to determine an access path.

If DBMS 106 determines that a first access option is included (yes branch, decision block 212), then DBMS 106 updates status flag 122 for index 114 to indicate a status of SUSPEND-PENDING in system catalog 116 (step 214). DBMS 106 stores an indicator for the selection of the first access option related to index 114 in system catalog 116. The status of SUSPEND-PENDING means that index 114 is still available for use by the query optimizer of DBMS 106. At this point, the request has completed, and processing ends.

Returning to decision block 212, if DBMS 106 determines that a first access option is not included (no branch, decision block 212), then DBMS 106 updates timestamp 124 for index 114 in system catalog 116 (step 216). The received request to delay suspension of index 114 may include a parameter indicating when to actuate index 114. The parameter may specify a day and time to actuate index 114, or may provide a time delta to use in calculating a day and time to actuate index 114. In one embodiment, DBMS 106 may also include a default time delta value, such as +3 hours from the current time, used for delayed actuation when the user does not provide the specific day and time or time delta.

DBMS 106 schedules a job to actuate index 114 per timestamp 124 (step 218). In one embodiment, DBMS 106 generates a batch job for actuating index 114, which may run by an internal or external job scheduler component of DBMS 106. DBMS 106 logs the scheduled batch job in system catalog 116 with reference to index 114 to enable subsequent searching for the scheduled job. In one embodiment, the scheduled job starts at the day and time in timestamp 124. In another embodiment, a scheduled job starts on a regular basis, such as every day at 3:00 AM, and reads system catalog 116 to determine all indices that have reached the associated temporal limit at that time. DBMS 106 actuates the indices based, at least in part, on the contents of status flag 122 and timestamp 124.

DBMS 106 updates status flag 122 for index 114 to indicate a status of SUSPEND-PENDING in system catalog 116 (step 214). The status of SUSPEND-PENDING means that index 114 is still available for use by the query optimizer of DBMS 106. DBMS 106 later actuates index 114 using the scheduled job, which starts processing at the day and time in timestamp 124. At this point, the request has completed, and processing ends.

FIG. 3 is a flowchart depicting the operational steps of a DBMS for reading a database table with a suspended index, in accordance with an embodiment of the present invention. Requests to read a database table may be in the form of a query to select a subset of table 112. Flow 300 depicts reading a database table, e.g., table 112, such that index 114 is needed to optimize the access path for the query. An SQL example query may include the following: "SELECT*FROM TABLE 112 WHERE LASTNAME='Smith'" where index 114 includes data from database field LASTNAME.

Initially, DBMS 106 on server computer 102 receives credentials from a user of server computer 102 or client computer 104 for validation. For example, users may include database administrators or developers accessing database 108 directly through DBMS 106, or remotely through client application 118. Responsive to determining that the credentials have read authority, DBMS 106 allows the user or application read access to database 108. If the user does not have the proper authority, then no access is granted, and no tasks are performed.

DBMS 106 receives a request to read table 112 using index 114 (step 302). In one embodiment, client application 118 on client computer 104 may send a request to read table 112 by transmitting a query to DBMS 106 to retrieve selected data from table 112 in database 108. Client application 118 may receive the query as an SQL statement from a user via UI 120, or may generate an SQL statement from input received from the user via UI 120. In another embodiment, DBMS 106 receives the request or query to read table 112 from a user through UI 126 on server computer 102, such as a database administrator using a command line processor.

DBMS 106 retrieves status flag 122 and timestamp 124 for index 114 in system catalog 116 (step 304). DBMS 106 has access to status flag 122 and timestamp 124 and may retrieve the contents ahead of use, or at each point of use. In the case where a first access option was selected and included in the suspension request for index 114, timestamp 124 may not be used or may be empty, and DBMS 106 would ignore timestamp 124.

DBMS 106 determines if status flag 122 indicates that index 114 is in SUSPEND status (decision block 306). If DBMS 106 determines that status flag 122 indicates that index 114 is not in SUSPEND status (no branch, decision block 306), then DBMS 106 determines an access path for the query using index 114 (step 316). If index 114 is not in SUSPEND status, then index 114 must either be in ACTIVE or SUSPEND-PENDING status. In either case, index 114 is available to the query optimizer of DBMS 106 for determining an access path.

DBMS 106 processes the query using the determined access path, and transmits results to the originating requestor (step 320). At this point, the requested query has completed and processing ends.

Returning to decision block 306, if DBMS 106 determines that status flag 122 indicates that index 114 is in SUSPEND status (yes branch, decision block 306), then DBMS 106 determines if actuation of index 114 is by first access (decision block 307). DBMS 106 reads system catalog 116 to determine if an indicator for first access option exists in relationship to index 114.

If DBMS 106 determines that actuation of index 114 is by first access (yes branch, decision block 307), then DBMS 106 rebuilds index 114 based on metadata stored in system catalog 116 (step 312). The metadata for index 114 was originally stored in step 206, as depicted and described in reference to FIG. 2. Responsive to the first instance of accessing index 114, which is in a status of suspension, DBMS 106 triggers the rebuilding of index 114.

DBMS 106 updates status flag 122 for index 114 to ACTIVE in system catalog 116 (step 314). After the completion of rebuilding index 114, DBMS 106 updates status flag 122 to indicate that index 114 is in ACTIVE status.

DBMS 106 determines an access path for the received query using index 114 (step 316). After setting index 114 to indicate an ACTIVE status, index 114 is now available to the query optimizer of DBMS 106 for determining an access path.

DBMS 106 processes the query using the determined access path, and transmits results to the originating requestor (step 320). DBMS 106 selects data from table 112 per the query, and sends any results to the originating requestor, such as a database administrator using UI 126 on server computer 102, or a database developer using UI 120 on client computer 104. At this point, the query has completed and processing ends.

Returning to decision block 307, if DBMS 106 determines that actuation of index 114 is not by first access (no branch, decision block 307), then DBMS 106 determines if the current time is after the day and time stored in timestamp 124 (decision block 308). DBMS 106 uses the retrieved contents of timestamp 124 to determine if DBMS 106 has reached the temporal limit stored in timestamp 124 for actuating index 114.

If DBMS 106 determines that the current time is not after the time stored in timestamp 124 (no branch, decision block 308), then DBMS 106 determines an access path for the received query without using index 114 (step 318). If the time to rebuild index 114 has not yet passed, then the query optimizer of DBMS 106 determines the access path for the query using any table 112 related indices with a status of ACTIVE or SUSPEND-PENDING which are available. If there are no such indices available, then DBMS 106 processes the query by going through table 112 row by row.

DBMS 106 processes the query using the determined access path, and transmits results to the originating requestor (step 320). DBMS 106 selects data from table 112 per the query, and sends any results to the originating requestor, such as a database administrator using UI 126 on server computer 102, or a database developer using UI 120 on client computer 104. At this point, the query has completed and processing ends.

Returning to decision block 308, if DBMS 106 determines that the current time is after the time stored in timestamp 124 (yes branch, decision block 308), then DBMS 106 clears timestamp 124 for index 114 in system catalog 116 (step 310). A scheduled event for actuation of index 114 is no longer necessary.

DBMS 106 rebuilds index 114 based on metadata stored in system catalog 116 (step 312). If the current time is after, or later than the stored time, then DBMS 106 initiates to rebuild index 114 using the definition stored in system catalog 116.

DBMS 106 updates status flag 122 for index 114 to ACTIVE in system catalog 116 (step 314). After the completion of rebuilding index 114, DBMS 106 updates status flag 122 to indicate that index 114 is in ACTIVE status.

DBMS 106 determines an access path for the received query using index 114 (step 316). After setting index 114 to indicate an ACTIVE status, index 114 is now available to the query optimizer of DBMS 106 for determining an access path.

DBMS 106 processes the query using the determined access path, and transmits results to the originating requestor (step 320). DBMS 106 selects data from table 112 per the query, and sends any results to the originating requestor, such as a database administrator using UI 126 on server computer 102, or a database developer using UI 120 on client computer 104. At this point, the query has completed and processing ends.

Figure 4:
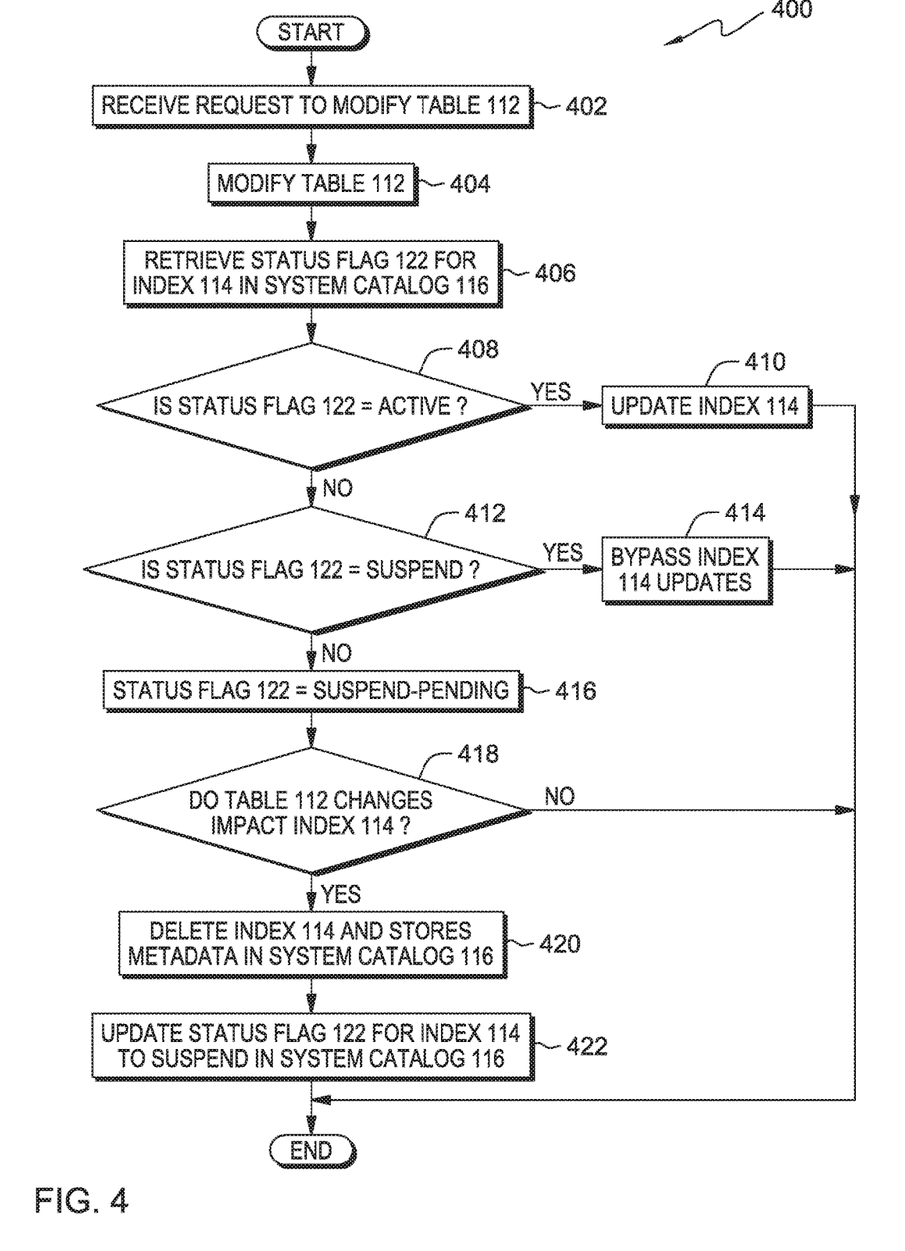
FIG. 4 is a flowchart depicting the operational steps of a DBMS for modifying a database table with a suspended index, in accordance with an embodiment of the present invention.

FIG. 4 is a flowchart depicting the operational steps of a DBMS for modifying a database table with a suspended index, in accordance with an embodiment of the present invention. Flow 400 depicts DBMS 106 modifying database table 112 such that index 114 has updates, which reflect modifications to table 112. If index 114 needs updating, then DBMS 106 determines whether the updates are performed or bypassed, or whether index 114 is deleted.

Initially, DBMS 106 on server computer 102 receives credentials from a user of server computer 102 or a user of client computer 104 for validation. For example, users may include database administrators or developers accessing database 108 directly through DBMS 106, or remotely through client application 118. Responsive to determining that the credentials have the authority to modify table 112 of database 108, DBMS 106 allows the user or application access to database 108. In SQL terms, the user has the ability to perform INSERT, UPDATE, and DELETE commands. If the user does not have the proper authority, then no tasks requiring modifying table 112 are allowed.

DBMS 106 receives a request to modify table 112 (step 402). In one embodiment, client application 118 on client computer 104 may send a request to modify table 112 by transmitting a query to DBMS 106 to insert selected data into table 112 in database 108. Client application 118 may receive the query as an SQL statement from a user via UI 120, or may generate an SQL statement from input received from the user via UI 120. In another embodiment, DBMS 106 receives the request or query to modify table 112 from a user through UI 126 on server computer 102, such as a database administrator using a command line processor.

DBMS 106 modifies table 112 per the received request (step 404). DBMS 106 performs the query or SQL statement and updates, inserts, or deletes data within table 112 related to contents within index 114. Index 114 includes one or more columns from table 112, or pointers to one or more columns in table 112. In any case, the requested modification to table 112 requires an update to index 114 in system catalog 116.

DBMS 106 retrieves status flag 122 for index 114 in system catalog 116 (step 406). DBMS 106 has access to status flag 122 and may retrieve the contents ahead of use, or at each point of use.

DBMS 106 determines if status flag 122 indicates that index 114 is in ACTIVE status (decision block 408). If DBMS 106 determines that status flag 122 indicates that index 114 is in ACTIVE status (yes branch, decision block 408), then DBMS 106 updates index 114 (step 410). DBMS 106 updates index 114 to reflect any changes to table 112. At this point, the requested query has completed and processing ends.

Returning to decision block 408, if DBMS 106 determines that status flag 122 indicates that index 114 is not in ACTIVE status (no branch, decision block 408), then DBMS 106 determines if status flag 122 indicates that index 114 is in SUSPEND status (decision block 412).

If DBMS 106 determines that status flag 122 indicates that index 114 is in SUSPEND status (yes branch, decision block 412), then DBMS 106 bypasses index 114 updates (step 414). When index 114 was set to SUSPEND status, DBMS 106 deleted the contents of index 114. If index 114 is empty or deleted, then there is nothing to update. At this point, the requested query has completed and processing ends.

Returning to decision block 412, if DBMS 106 determines that status flag 122 indicates that index 114 is not in SUSPEND status (no branch, decision block 412), then DBMS 106 determines that status flag 122 indicates that index 114 is in SUSPEND-PENDING status (step 416). In the illustrative embodiment, only three status conditions are available. If there were more than three status conditions, then step 416 would be a decision block.

DBMS 106 determines if table 112 changes impact index 114 (decision block 418). If DBMS 106 determines that table 112 changes do not impact index 114 (no branch, decision block 418), then the requested query has completed and processing ends. If there are no potential changes to index 114 related to changes in table 112, then index 114 stays in SUSPEND-PENDING status, and the query access path is determined using index 114. DBMS 106 processes the query using the determined access path, and transmits results to the originating requestor.

Returning to decision block 418, if DBMS 106 determines that table 112 changes do impact index 114 (yes branch, decision block 418), then DBMS 106 deletes index 114 and stores metadata defining index 114 in system catalog 116 (step 420). To delete index 114, DBMS 106 clears out the contents of index 114, or physically deletes index 114, while retaining any related metadata defining index 114 to allow the subsequent rebuilding of index 114. Index 114 is defined by an SQL command entered by a DBA when initially creating index 114. The SQL command is stored in system catalog 116 for future use by DBMS 106 to rebuild index 114 when requested at a later time.

DBMS 106 updates status flag 122 for index 114 to SUSPEND in system catalog 116 (step 422). DBMS 106 updates status flag 122 to indicate that index 114 is in SUSPEND status. After index 114 is cleared or deleted, DBMS 106 updates status flag 122, which is used by the query optimizer of DBMS 106 to determine if an index is available for use when processing a query. At this point, the requested query has completed and processing ends.

Figure 5:
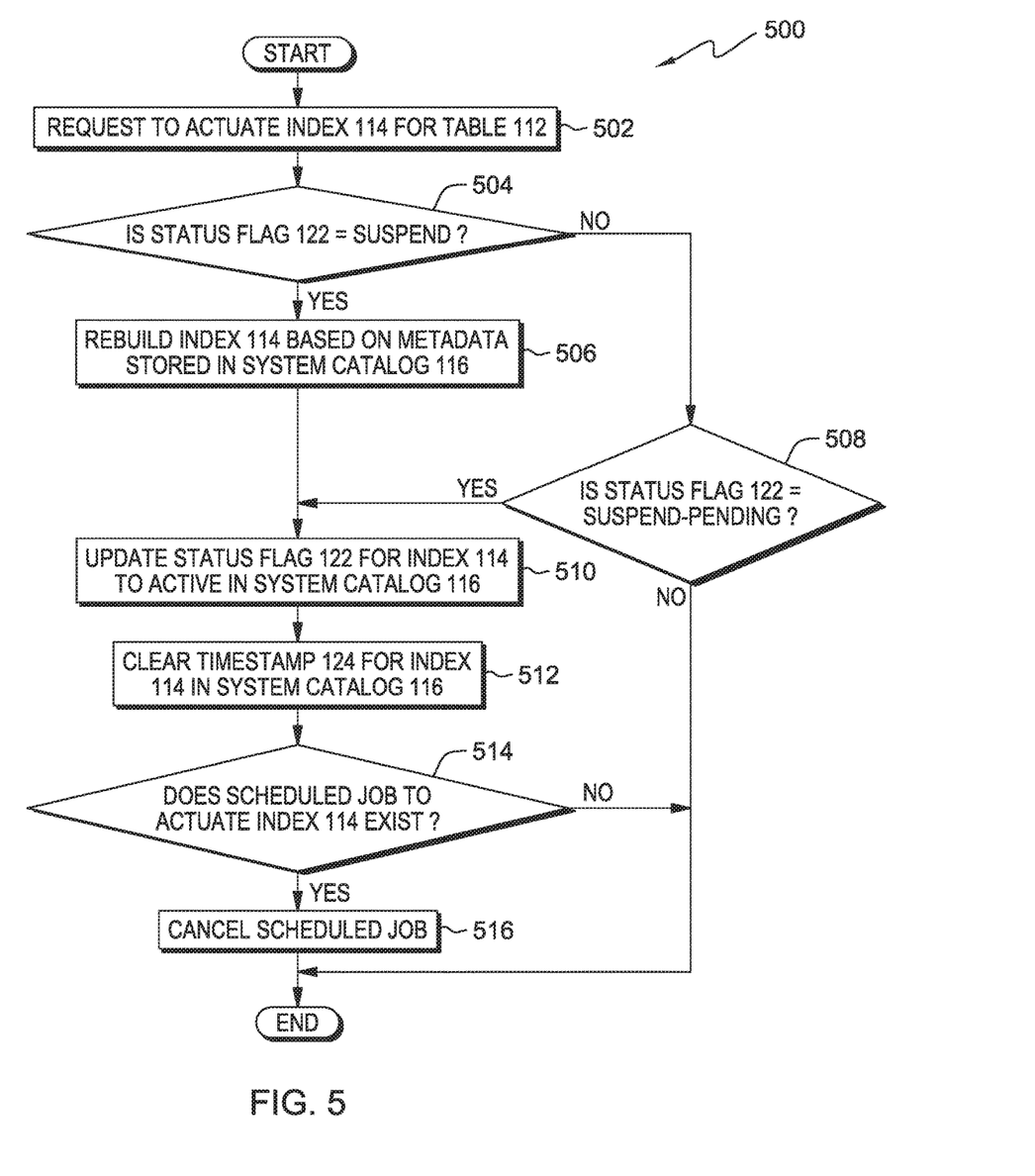
FIG. 5 is a flowchart depicting the operational steps of a DBMS for actuating a suspended index, in accordance with an embodiment of the present invention.

FIG. 5 is a flowchart depicting the operational steps of a DBMS for actuating a suspended index, in accordance with an embodiment of the present invention. Flow 500 depicts actuating a suspended index. In the illustration, the request to actuate index 114 may come from either a scheduled batch job, or a command manually entered by a user.

Initially, DBMS 106 on server computer 102 receives credentials from a user of server computer 102 or client computer 104 for validation. For example, users may include database administrators or developers accessing database 108 directly through DBMS 106, or remotely through client application 118. Responsive to determining that the credentials have the authority to actuate index 114, DBMS 106 allows the user or application to actuate index 114. If the user does not have the proper authority, then no tasks requiring actuating index 114 are performed.

DBMS 106 receives a request to actuate index 114 for table 112 (step 502). In various embodiments, DBMS 106 includes an SQL command to actuate an index of a database table. In one embodiment, client application 118 on client computer 104 may send a request to actuate index 114 for table 112 by transmitting a query to DBMS 106. Client application 118 may receive the query as an SQL statement from a user via UI 120, or may generate an SQL statement from input received from the user via UI 120. In another embodiment, DBMS 106 receives the request to actuate index 114 from a scheduled batch job (which was created in step 218 of FIG. 2). In other embodiments, DBMS 106 may receive a request from a regularly scheduled job, which actuates all indices of a database in which the current time is greater than the time stored in the timestamp for the respective index. In another embodiment, DBMS 106 receives the request or query to actuate index 114 for table 112 from a user through UI 126 on server computer 102, such as a database administrator using a command line processor. A manually entered command to actuate index 114 may override a temporal option or first update option related to index 114.

DBMS 106 determines if status flag 122 indicates that index 114 is in SUSPEND status (decision block 504). If DBMS 106 determines that status flag 122 indicates that index 114 is in SUSPEND status (yes branch, decision block 504), then DBMS 106 rebuilds index 114 based on metadata stored in system catalog 116 (step 506). If index 114 is already in SUSPEND status and DBMS 106 receives a call to actuate index 114, then DBMS 106 initiates to rebuild index 114 using the definition stored in system catalog 116.

DBMS 106 updates status flag 122 for index 114 to ACTIVE in system catalog 116 (step 510). After the completion of rebuilding index 114, DBMS 106 updates status flag 122 to indicate that index 114 is in ACTIVE status.

DBMS 106 clears timestamp 124 for index 114 in system catalog 116 (step 512). Whenever index 114 is set to indicate an ACTIVE status, DBMS 106 clears timestamp 124. A scheduled time for actuation of index 114 is no longer necessary.

DBMS 106 determines if a scheduled job to actuate index 114 exists (decision block 514). When created in flow 200 of FIG. 2, the scheduled batch job was logged in reference to index 114 in system catalog 116. DBMS 106 searches system catalog 116 for an indication of a scheduled job related to index 114.

If DBMS 106 determines that a scheduled job to actuate index 114 does exist (yes branch, decision block 514), then DBMS 106 cancels the scheduled job (step 516). After index 114 has been actuated or rebuilt, an automated job to request actuation of index 114 is no longer required, and DBMS 106 deletes the job. At this point, the request has completed and processing ends.

Returning to decision block 514, if DBMS 106 determines that a scheduled job to actuate index 114 does not exist (no branch, decision block 514), then the request has completed and processing ends. Index 114 has been rebuilt, status flag 122 has been updated, timestamp 124 has been cleared, and no other tasks of DBMS 106 are required.

Returning to decision block 504, if DBMS 106 determines that status flag 122 indicates that index 114 is not in SUSPEND status (no branch, decision block 504), then DBMS 106 determines if status flag 122 indicates that index 114 is in SUSPEND-PENDING status (decision block 508). If status flag 122 does not indicate a status of SUSPEND, then the options for status flag 122 are either ACTIVE, or SUSPEND-PENDING.

If DBMS 106 determines that status flag 122 indicates that index 114 is not in SUSPEND-PENDING status (no branch, decision block 508), the request has completed and processing ends. If status flag 122 does not indicate a status of SUSPEND-PENDING, then the only remaining option, in a three-option system, for status flag 122 is ACTIVE. If index 114 is ACTIVE, then no actuation is needed and processing ends.

Returning to decision block 508, if DBMS 106 determines that status flag 122 indicates that index 114 is in SUSPEND-PENDING status (yes branch, decision block 508), then DBMS 106 updates status flag 122 for index 114 to ACTIVE in system catalog 116 (step 510). Since status flag 122 indicates that index 114 is in SUSPEND-PENDING status, index 114 has not been modified during any data load operations, and does not need to be rebuilt. DBMS 106 updates status flag 122 to indicate a status of ACTIVE for index 114.

DBMS 106 clears timestamp 124 for index 114 in system catalog 116 (step 512). In the case of a first access option for actuation of index 114, timestamp 124 may not exist or may be empty, in which case, DBMS 106 may skip step 512.

DBMS 106 determines if a scheduled job to actuate index 114 exists (decision block 514). When created in flow 200 of FIG. 2, the scheduled batch job was logged in reference to index 114 in system catalog 116. DBMS 106 searches system catalog 116 for an indication of a scheduled job related to index 114.

If DBMS 106 determines that a scheduled job to actuate index 114 does exist (yes branch, decision block 514), then DBMS 106 cancels the scheduled job (step 516). After status flag 122 for index 114 has been set to ACTIVE, an automated job to request actuation of index 114 is no longer required, and DBMS 106 deletes the job. At this point, the request has completed and processing ends.

Returning to decision block 514, if DBMS 106 determines that a scheduled job to actuate index 114 does not exist (no branch, decision block 514), then the request has completed and processing ends. Status flag 122 for index 114 has already been set to ACTIVE, timestamp 124 has been cleared, and no other tasks of DBMS 106 are required.

Figure 6:
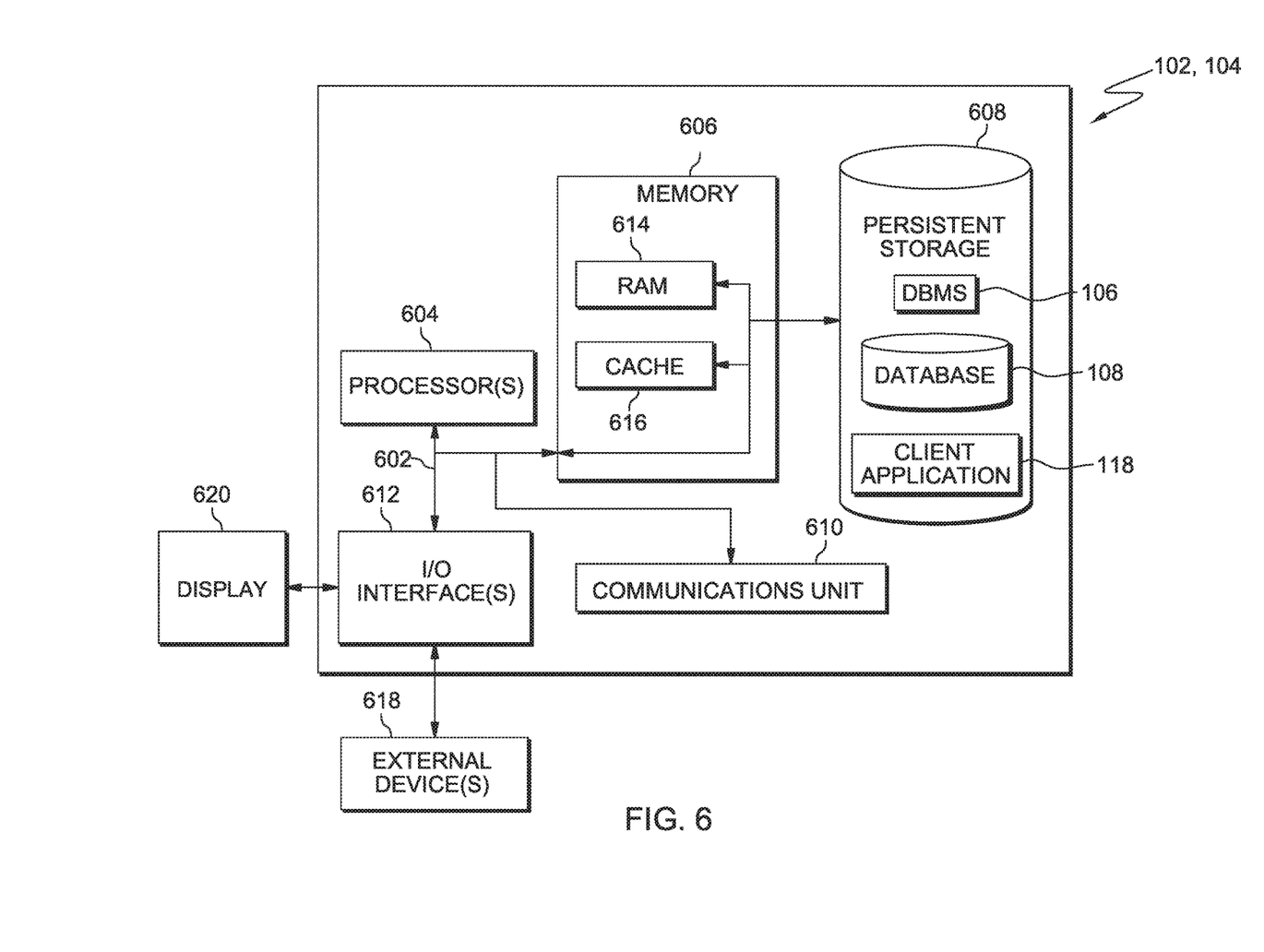
FIG. 6 depicts a block diagram of components of an illustrative computer system, in accordance with an illustrative embodiment of the present invention.

FIG. 6 depicts a block diagram of respective components of server computer 102 and client computer 104, in accordance with an illustrative embodiment of the present invention. It may be appreciated that FIG. 6 provides only an illustration of one implementation and does not imply any limitations with regard to the environments in which different embodiments may be implemented. Many modifications to the depicted environment may be made.

Server computer 102 and client computer 104, each include respective communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

DBMS 106, database 108, and client application 118 are stored in respective persistent storage 608 for execution and/or access by one or more of the further respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of server computer 102 and client computer 104. In these examples, communications unit 610 includes one or more network interface cards. Communications unit 610 may provide communications through the use of either or both physical and wireless communications links. DBMS 106, database 108, and client application 118 may be downloaded to respective persistent storage 608 through communications unit 610.

I/O interface(s) 612 allows for input and output of data with other devices that may be connected to server computer 102 and client computer 104. For example, I/O interface 612 may provide a connection to external device(s) 618 such as a keyboard, a keypad, a touch screen, and/or some other suitable input device. External device(s) 618 can also include portable computer readable storage media such as, for example, thumb drives, portable optical or magnetic disks, and memory cards. Software and data used to practice embodiments of the present invention, e.g., DBMS 106, database 108, and client application 118, can be stored on such portable computer readable storage media and can be loaded onto respective persistent storage 608 via I/O interface(s) 612. I/O interface(s) 612 also connect to a display 620.

Display 620 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for suspending a database index, the method comprising:
   a computer determining if an update to a database includes a request to suspend an index of the database;
   if so, the computer determining if the request to suspend includes a parameter indicating an immediate suspension of the index; and
   if so, the computer suspending the index of the database, wherein the suspending the index of the database comprises:
   the computer deleting the index of the database;
   the computer retaining metadata defining the index of the database, wherein the metadata includes a command for rebuilding the index of the database; and
   the computer indicating in a system catalog of the database that a status of suspension has been applied to the index, wherein the status is used to determine whether the index is available for use when processing a query and wherein the status of suspension indicates the index should not be used when processing a query.

2. The method of claim 1, further comprising:
   the computer receiving a request to place the index of the database in a status of pending suspension; and
   the computer indicating in the system catalog of the database that a status of pending suspension has been applied to the index, wherein the status of pending suspension indicates the index is available for use when processing a query.

3. The method of claim 1, further comprising:
   the computer receiving a temporal limit, wherein the temporal limit determines when the index of the database is actuated;
   responsive to reaching a temporal limit, the computer rebuilding the index of the database using the retained metadata for the index of the database; and the computer indicating in the system catalog of the database that a status of active has been applied to the index.

4. The method of claim 1, further comprising:
the computer receiving a selection for a first access option for actuating the suspended index, wherein a first instance of accessing the suspended index of the database triggers rebuilding the index;
responsive to a first instance of accessing the suspended index of the database, the computer rebuilding the index of the database using the retained metadata for the index of the database; and
the computer indicating in the system catalog of the database that a status of active has been applied to the index.

5. The method of claim 1, wherein the index of the database further comprises a subset of a plurality of indices of the database.

6. The method of claim 1, further comprising:
the computer receiving a request to actuate the index of the database that has the status of pending suspension; and
responsive to receiving the request to actuate the index of the database, the computer indicating in the system catalog of the database that a status of active has been applied to the index.

7. The method of claim 1, further comprising:
responsive to an attempt to update a suspended index of the database, the computer bypassing one or more updates to the index of the database.

8. A computer program product for suspending a database index, the computer program product comprising:
a computer readable storage medium and program instructions stored on the computer readable storage medium, the program instructions executable by a computer processor, the program instructions comprising:
program instructions to determine if an update to a database includes a request to suspend an index of the database;
program instructions to determine if the request to suspend includes a parameter indicating an immediate suspension of the index in response to determining that the update includes the request to suspend the index; and
program instructions to suspend the index of the database in response to determining that the request to suspend includes the parameter indicating the immediate suspension of the index of the database, wherein the suspending the index of the database comprises:
program instructions to delete the index of the database;
program instructions to retain metadata defining the index of the database, wherein the metadata includes a command for rebuilding the index of the database; and
program instructions to indicate in a system catalog of the database that a status of suspension has been applied to the index, wherein the status is used to determine whether the index is available for use when processing a query and wherein the status of suspension indicates the index should not be used when processing a query.

9. The computer program product of claim 8, further comprising:

program instructions to receive a request to place the index of the database in a status of pending suspension; and
program instructions to indicate in the system catalog of the database that a status of pending suspension has been applied to the index, wherein the status of pending suspension indicates the index is available for use when processing a query.

10. The computer program product of claim 8, further comprising:
program instructions to receive a temporal limit, wherein the temporal limit determines when the index of the database is actuated;
program instructions to rebuild the index of the database using the retained metadata for the index of the database, in response to reaching a temporal limit; and
program instructions to indicate in the system catalog of the database that a status of active has been applied to the index.

11. The computer program product of claim 8, further comprising:
program instructions to receive a selection for a first access option for actuating the suspended index, wherein a first instance of accessing the suspended index of the database triggers program instructions to rebuild the index;
program instructions to rebuild the index of the database using the retained metadata for the index of the database, in response to a first instance of accessing the suspended index of the database; and
program instructions to indicate in the system catalog of the database that a status of active has been applied to the index.

12. The computer program product of claim 8, wherein the index of the database further comprises a subset of a plurality of indices of the database.

13. The computer program product of claim 8, further comprising:
program instructions to receive a request to actuate the index of the database that has the status of pending suspension; and
program instructions to indicate in the system catalog of the database that a status of active has been applied to the index, in response to receiving the request to actuate the index of the database.

14. The computer program product of claim 8, further comprising:
program instructions to bypass one or more updates to the index of the database, in response to an attempt to update a suspended index of the database.

15. A computer system for suspending a database index, the computer system comprising:
one or more computer processors;
one or more computer readable storage media;
program instructions stored on the computer readable storage media for execution by at least one of the one or more processors, the program instructions comprising:
program instructions to determine if an update to a database includes a request to suspend an index of the database;
program instructions to determine if the request to suspend includes a parameter indicating an immediate suspension of the index in response to determining that the update includes the request to suspend the index; and program instructions to suspend the index of the database in response to determining that the request to suspend includes the parameter indicating the immediate suspension of the index of the database, wherein the suspending the index of the database comprises:

program instructions to delete the index of the database;

program instructions to retain metadata defining the index of the database, wherein the metadata includes a command for rebuilding the index of the database; and program instructions to indicate in a system catalog of the database that a status of suspension has been applied to the index, wherein the status is used to determine whether the index is available for use when processing a query and wherein the status of suspension indicates the index should not be used when processing a query.

16. The computer system of claim 15, further comprising:
program instructions to receive a request to place the index of the database in a status of pending suspension; and program instructions to indicate in the system catalog of the database that a status of pending suspension has been applied to the index, wherein the status of pending suspension indicates the index is available for use when processing a query.

17. The computer system of claim 15, further comprising:
program instructions to receive a temporal limit, wherein the temporal limit determines when the index of the database is actuated;

program instructions to rebuild the index of the database using the retained metadata for the index of the database, in response to reaching a temporal limit; and program instructions to indicate in the system catalog of the database that a status of active has been applied to the index.

18. The computer system of claim 15, further comprising:
program instructions to receive a selection for a first access option for actuating the suspended index, wherein a first instance of accessing the suspended index of the database triggers program instructions to rebuild the index;

program instructions to rebuild the index of the database using the retained metadata for the index of the database, in response to a first instance of accessing the suspended index of the database; and program instructions to indicate in the system catalog of the database that a status of active has been applied to the index.

19. The computer system of claim 15, further comprising:
program instructions to receive a request to actuate the index of the database that has the status of pending suspension; and program instructions to indicate in the system catalog of the database that a status of active has been applied to the index, in response to receiving the request to actuate the index of the database.

20. The computer system of claim 15, further comprising:
program instructions to bypass one or more updates to the index of the database, in response to an attempt to update a suspended index of the database.

* * * * *